United States Patent
Sadjadian et al.

(10) Patent No.: US 6,845,179 B1
(45) Date of Patent: *Jan. 18, 2005

(54) MOTION PREDICTED IMAGE SIGNAL COMPRESSION

(75) Inventors: Ahmad Sadjadian, Swindon (GB); Jonathan James Stone, Reading (GB)

(73) Assignees: Sony Corporation, Tokyo (JP); Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1169 days.

(21) Appl. No.: 08/882,625

(22) Filed: Jun. 25, 1997

(30) Foreign Application Priority Data

Oct. 9, 1996 (GB) .............................................. 9621066

(51) Int. Cl.[7] .................................................. G06K 9/36
(52) U.S. Cl. ........................ 382/236; 382/240; 382/239
(58) Field of Search ................................ 382/236, 239, 382/252, 240; 348/416, 699, 398, 417, 402, 405, 700, 407, 413, 423

(56) References Cited

U.S. PATENT DOCUMENTS

| 5,440,344 A | | 8/1995 | Asamura et al. ........ 375/240.04 |
| 5,446,495 A | * | 8/1995 | Tourtier et al. ............. 348/398 |
| 5,477,272 A | * | 12/1995 | Zhang et al. ............... 382/407 |
| 5,565,920 A | * | 10/1996 | Lee et al. ................... 348/398 |

FOREIGN PATENT DOCUMENTS

| EP | 0 588 476 A2 | | 3/1994 | ............ H04N/7/13 |
| EP | 0 637 175 A2 | | 2/1995 | ............ H04N/7/24 |
| EP | 0 727 907 A1 | | 8/1996 | .......... H04N/5/926 |
| FR | 2654887 A1 | * | 5/1991 | ............ H04N/7/01 |
| GB | 2 306 831 | | 5/1997 | ............ H04N/7/50 |
| GB | 2 318 472 | | 4/1998 | ............ H04N/7/50 |

* cited by examiner

*Primary Examiner*—Wenpeng Chen
(74) *Attorney, Agent, or Firm*—Frommer Lawrence & Haug LLP; William S. Frommer; Bruno Polito

(57) ABSTRACT

A motion predictive inter frame compression system comprising a wavelet transform unit (80) for transforming space domain image data to the frequency domain. A motion estimator (30) operates in the space domain to produce motion vectors. The motion vectors are converted in a converter (31) to the frequency domain.

5 Claims, 2 Drawing Sheets

THREE STAGE WAVELET FREQUENCY DOMAIN REPRESENTATION

MOTION PREDICTED IMAGE SIGNAL COMPRESSION

BACKGROUND OF THE INVENTION

1. Field of the Invention

The present invention relates to motion predicted image signal compression.

2. Description of the Prior Art

A motion predicted, inter frame, image signal compression system is known. An example of such a system is MPEG-2 as set out in the Motion Pictures Expert Group II standard ISO/IEC Publication DIS 13818/2 "Information Technology—generic coding of motion pictures and associated audio information, March 1995. Such a system uses Discrete Cosine Transformation (DCT) of image data as one of several compression techniques.

To additionally compress the image data, motion prediction is used, in which there is calculated in the space domain the position in a reference frame of an image block, which image block (called the search block) occurs in a succeeding frame. That is done by comparing the search block with similar size blocks in the reference frame until a match (if any) is found. In place of the image information of the search block, only the position of the matching block in the reference frame is used. The image information of the search block is then derived from the matching block in the reference frame. The matching block in the reference frame is used as a prediction of the search block. The position information so produced is termed a "motion vector".

It has been proposed to implement a motion-compensated inter-frame compression system using another known transform such a Wavelet Transform or a Sub-Band Transform in place of DCT.

When a Wavelet Transform or a Sub-Band Transform is used, an input image is transformed into two dimensional spatial frequency bands, each of which is a differently sub-sampled version of the input image.

It has been proposed that frequency domain motion prediction is carried out on the frequency transformed data. To do that a search block is defined for each frequency band. For each frequency band the search block is compared to correspondingly sized blocks in a reference frame. Thus for each frequency transformed image frame as many motion predictions are needed as there are frequency bands.

SUMMARY OF THE INVENTION

According to the present invention, there is provided a motion predicted inter-frame image signal compression system comprising means for transforming image data from one of a space domain and a frequency domain to the other, means operating in the said one domain to produce motion vectors and means for converting the said motion vectors to the other domain.

Thus in an embodiment of the invention, image data is transformed from the space domain (the said one domain) to the frequency domain (the said other domain) by a Wavelet Transform. The motion prediction signals are produced in the space domain and are converted to the frequency domain.

This avoids using a plurality of search blocks for respective frequency bands.

A search block is used in the space domain to produce a motion vector. The motion vector is then converted to a set of motion vectors, one for each frequency band in the wavelet transformed image. In a preferred embodiment, the converting means converts the space domain vectors to vectors for each of the frequency bands by scaling the space domain vectors proportionally to the sub-sampling factors of each of the blocks.

In the embodiment the frequency domain the motion vectors are produced from sub-sampled images which have lower resolution than a corresponding space domain image which is no sub-sampled. By producing motion vectors in the space domain, the vectors are more accurate.

As a transform from one domain to another is a reversible process, motion vectors may be produced in e.g. the frequency domain and then converted to the space domain. It is believed that such conversion maybe advantageous where an image has been sub-sampled in the space domain before motion vector generation. The conversion maybe achieved by suitably scaling-up a motion vector calculated from one of the wavelet sub-bands.

BRIEF DESCRIPTION OF THE DRAWINGS

The above and other objects, features and advantages of the invention will be apparent from the following detailed description of illustrative embodiments which is to be read in connection with the accompanying drawings, in which.

For a better understanding of the present invention, reference will now be made by way of example to the accompanying drawings, in which.

DESCRIPTION OF THE PREFERRED EMBODIMENTS

Figure 1:
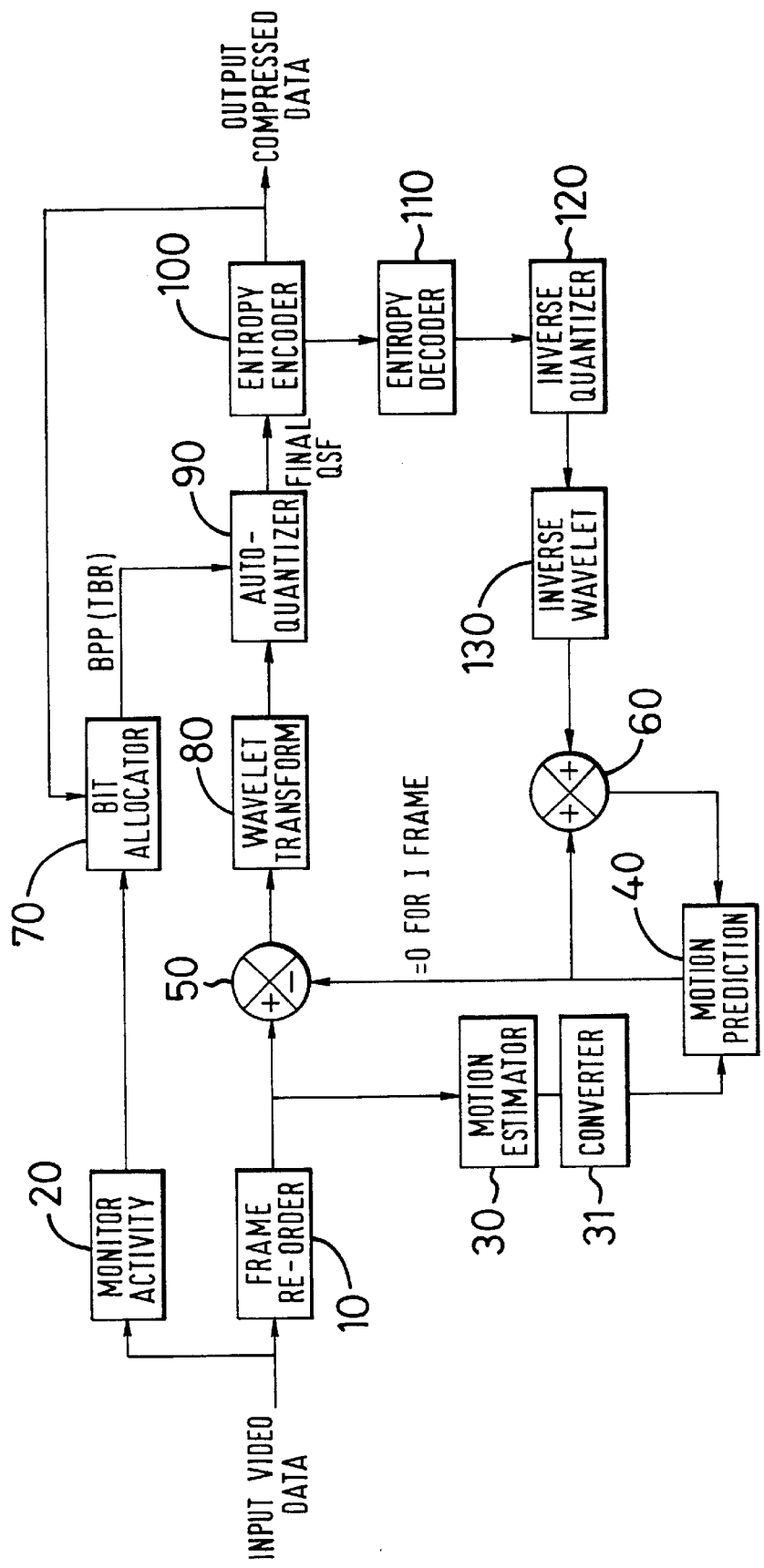
FIG. 1 is a schematic diagram of a video data compression system.

FIG. 1 is a schematic diagram of a video data compression apparatus comprising a frame reorderer 10, an activity detector 20, a motion estimator 30, a motion predictor 40, a subtracter 50, an adder 60, a bit allocator 70, a wavelet transform unit 80, an auto-quantiser 90, an entropy encoder 100, an entropy decoder 110, an inverse quantiser 120 and an inverse wavelet coder 130.

Many features of the apparatus of FIG. 1 operate in a very similar manner to corresponding features of an MPEG encoder. Such features will not be described in detail here.

Typically, in an MPEG encoder, the video signal is divided into successive groups of pictures (GOPs). Within each GOP at least one picture is encoded as an "I-picture", or intra-picture, using only information present in that picture itself. This means that I-pictures can later be decoded without requiring information from other pictures, and so provide random entry points into the video sequence. However, the converse of this is that the encoding of I-pictures cannot make use of the similarity between successive pictures, and so the degree of data compression obtained with I-pictures is only moderate.

Further pictures within each GOP may be encoded as "P-pictures" or predicted pictures. P-pictures are encoded with respect to the nearest previous I-picture or P-picture, so that only the differences between a P-picture and the previous P- or I-picture needs to be transmitted. Also, motion compensation is used to encode the differences, so a much higher degree of compression is obtained than with I-pictures.

Finally, some of the pictures within a GOP may be encoded as "B-pictures" or bidirectional pictures. These are encoded with respect to two other pictures, namely the nearest previous I- or P-picture and the nearest following I- or P-picture. B-pictures are not used as references for encoding other pictures, so a still higher degree of compression can be used for B-pictures because any coding errors caused by the high compression will not be propagated to other pictures.

Therefore, in each GOP there are (up to) three classes of picture, I-, P- and B- pictures, which tend to achieve different degrees of compression and so lend to require different shares of the overall available encoded bit stream. Generally, I-pictures require a large share of the available transmission or storage capacity, followed by P-pictures, and followed by B-pictures.

Briefly, therefore, the frame reorderer 10 receives input video data and acts on successive groups of pictures (GOP) to reorder the pictures so that each picture within the GOP is compressed after those pictures on which it depends. For example, if a B-picture (bi-directionally predicted picture) depends on a following I- or P-picture, it is reordered to be compressed after that I- or P- picture.

For example, if a GOP comprises the following four initial frames (in the order in which they are displayed), $I_0 B_1 B_2 P_3 \ldots$, where the P-picture uses the I-picture as a reference and the two B- pictures use the surrounding I- and P-pictures as references, then the frame reorderer 10 will reorder the GOP to be compressed in the following order: $I_0 P_3 B_1 B_2 \ldots$.

I- pictures are intra-picture encoded, that is to say the encoding is not based on any other reference pictures. An I-picture in a GOP is therefore passed from the frame reorderer 10 to the wavelet transform unit 80, the auto quantiser 90 and the entropy encoder 100 to generate output compressed data representing that I- picture.

The compressed I-picture data is also passed from the entropy encoder 100 through a decompression chain formed by the entropy decoder 110, the inverse quantiser 120, and the inverse wavelet transform unit 130. This reconstructs a version of the I- picture present in the decoder which is passed to the motion predictor 40.

The next picture of the GOP to be compressed, which will generally be a P-picture which depends on the I- picture as a reference, is passed from the frame reorderer 10 to the motion estimator 30 which generates motion vectors indicative of image motion between the I- and P- pictures. The motion predictor 40 then generates a predicted version of the P picture using the motion vectors and the decoded version of the I- picture. This predicted version of the P- picture is subtracted from the actual P- picture by the subtracter 50 and the difference between the 2 frames is passed to the wavelet transform unit 80 for compression. As before, the encoded (compressed) difference data is output by the entropy encoder and is then decoded by the decompression chain 110, 120, 130 to regenerate a version of the difference data.

In the adder 60 the difference data is then added to the previously decompressed version of the I- picture to generate a decompressed version of the P-picture which is then stored in the motion predictor 40 for use in the compression of the next picture.

This process continues, so that each picture which uses other pictures as a reference is in fact compressed by encoding difference data between the input picture and a version of the input picture formed by motion prediction from a previously compressed and then decompressed version of the reference picture. This means that the compression is performed with respect to the pictures which will be available at the decompressor.

The activity detector 20 detects the image "activity", or "degree of detail" in blocks of each input image. This process will be described in more detail with reference to FIG. 2 below.

The bit allocator 70 allocates target bit rates to whole pictures or blocks of the pictures in dependence on the image activity of pictures of the current GOP and the degree of quantisation obtained for I-, B and P- pictures of the preceding GOP. In fact, the allocation can be made by allocating an overall target bit rate for each GOP ($TBR_{GOP}$) in proportions dependent on the actual quantity of data generated for the corresponding frame in the preceding GOP, or in accordance with the actual I:B:P ratio achieved with the preceding GOP. In this way, the allocation or the I:B:P ratio can be "steered" to reflect the type of image content in use.

The target bits rates are supplied to the auto quantiser 90 which generates a suitable quantisation factor to be applied to the wavelet encoded data to comply with the target bit rates.

Figure 2:
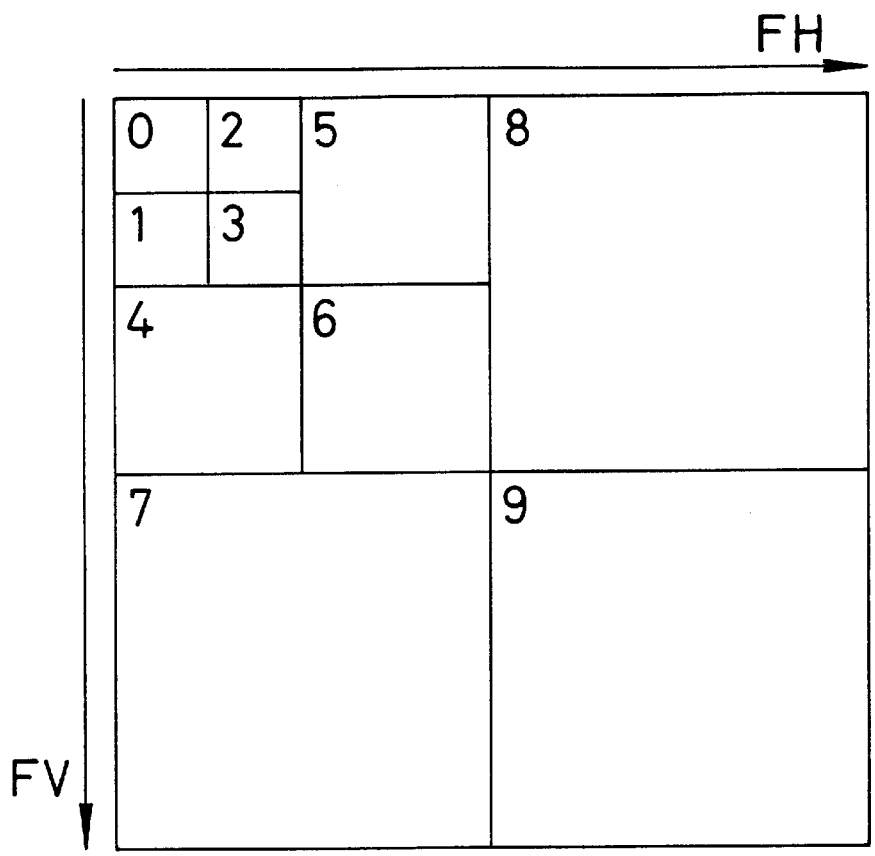
FIG. 2 is a frequency domain representation of a video frame when transformed by a 3-stage wavelet transform.

Referring to FIG. 2, the wavelet transform unit 80 transforms space domain video data to frequency domain data occupying, in this example, ten, two-dimensional spatial frequency sub-bands labelled 0 to 9 in FIG. 2. In FIG. 2 arrow FH indicates increasing horizontal frequency and arrow FV indicates increasing vertical frequency. The wavelet transform is known and thus will not be described in detail herein. Briefly, in the first stage of transformation the video data is sub-sampled vertically and horizontally by a factor of 2 producing 4 sub-bands occupying in quadrants 7, 8 and 9 plus a sub-band in the upper left quadrant (0–6). The sub-bands correspond to ¼ size images.

The sub-band in the upper left quadrant containing the lowest frequencies of the four sub-bands is again transformed, again being sub-sampled horizontally and vertically by a factor 2 to produce 4 sub-bands 4, 5, 6 and the upper left quadrant (0, 1, 2, 3) each representing a 1/16 size image.

Again the sub-band in upper left quadrant is transformed to four sub-bands 0, 1, 2, 3, each representing a 1/64 size image.

The most significant image data tends to be present in sub-band 0 and the least significant in sub-band 9. The quantizer 90 quantises sub-band 0 with the greatest accuracy and the sub-band 9 with the least accuracy to achieve compression without significant less of image quality.

Figure 3:
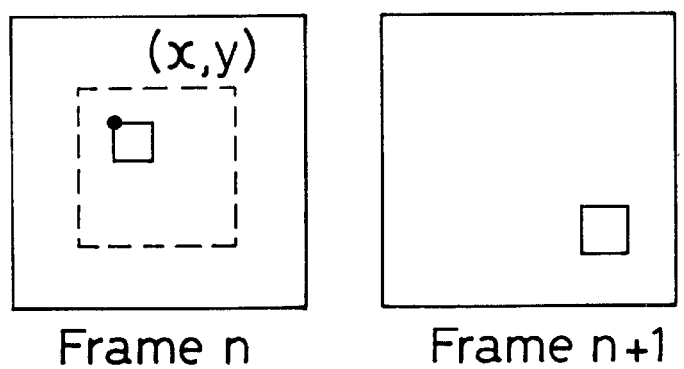
FIG. 3 shows two successive frames of picture information and illustrates movement of a pixel block from frame-to-frame.

Referring to FIG. 3, the motion estimator 30 operates in the space domain to produce motion vectors. The motion estimator 30 is known and will not be described herein in detail. Briefly, an object in frame n positioned within a 16×16 pixel block at position (x, y) defined by the top left hand corner of the block moves to a different position in the following frame n+1. Instead of encoding all the information of the block (the search block) in the frame n+1, only the position (x, y) of the same information in the preceding block in frame n is found by comparing the contents of the search block with the contents of one area (shown by the dotted line) around the likely position of the block in frame n. It is assumed that in 1/25 or 1/30th of a second (depending on the frame rate), an object moving at a predetermined maximum speed will be within the search area.

Whilst the above description refers to only one search block, in practice all 16×16 blocks in the frame n+1 are compared with corresponding search areas in frame n.

In accordance with the present invention, in the example shown in FIG. 1, the space domain motion vectors produced by the estimator 30 are converted to the frequency domain in a converter 31.

In the example of FIG. 1, the converter scales the motion vectors as follows, it being assumed that the sub-bands 0 to 9 of the wavelet encoded video correspond to sub-sampled space domain images.

Referring to FIG. 2, sub-bands 7, 8 and 9 are sub-sampled horizontally by 2 and vertically by 2.

Thus for motion vectors applicable to sub-bands 7, 8 and 9, the space domain vectors are divided by 2 horizontally and by 2 vertically.

Likewise for sub-bands 4, 5 and 6 which are sub-sampled by 4 horizontally and by 4 vertically, the space domain vectors are divided by 4 horizontally and vertically.

For sub-bands 0, 1, 2 and 3, the space domain vectors are divided by 8 horizontally and vertically.

The use of scaled space domain motion vectors with wavelet or sub-band transformed image data is especially advantageous. The filtering used for wavelet or sub-band filtering can be chosen to minimise aliasing between frequency bands. The converted space domain motion vectors provide greater accuracy than corresponding motion vectors derived in the frequency domain because the space domain motion vectors are derived from a frame which twice, four times or eight times the resolution horizontally and vertically than the corresponding frequency domain frame, depending on which sub-band is being considered.

It will be appreciated that the converter 31 may be controlled to scale the space domain motion vectors according to the wavelet sub-band being processed. In MPEG 2, encoded signals, control information is carried in the bit stream indicating the type of data in the stream. The converter 31 would be controlled by the control information.

Alternatively, such control information maybe omitted or not used the converter operating according to a preset algorithm.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A motion predictive inter-frame image signal compression system, comprising means for transforming image data, which includes a plurality of groups of pictures, from one of a space domain and a frequency domain into a plurality of data bands in the other domain, means for operating in said one domain to produce motion vectors, means for converting the motion vectors from said one domain into motion vectors for one of said bands, said image data of said one domain corresponding to a higher resolution than the data of said one of said bands; and means for allocating a target compressed-data bit rate to pictures or blocks of pictures of a current group of pictures according to a ratio of an amount of data generated during an intra-frame coding of a prior group of pictures and an amount of data generated during an inter-frame coding of said prior group of pictures.

2. A system according to claim 1, wherein the transforming means transforms the image data from the space domain to the frequency domain.

3. A system according to claim 2, wherein the image data is transformed into a plurality of spatial frequency bands, sub-sampled by respective factors.

4. A system according to claim 3, wherein the converting means converts the space domain vectors to vectors for each of the frequency bands by scaling the space domain vectors proportionally to the sub-sampling factors of each of the bands.

5. A system according to claim 2, wherein the transforming means transforms the image data to the frequency domain by use of a wavelet transform.

* * * * *